US012511339B1

(12) United States Patent
Gudla et al.

(10) Patent No.: US 12,511,339 B1
(45) Date of Patent: Dec. 30, 2025

(54) MACHINE LEARNING APPROACH TO PROVIDE ADAPTIVE SEARCH RESULT PAGE LOAD SIZE AND LAYOUT

(71) Applicant: Maplebear Inc., San Francisco, CA (US)

(72) Inventors: Vinesh Reddy Gudla, South San Francisco, CA (US); Laurentia Romaniuk, San Francisco, CA (US); Mohammed Asif Ashique Hussain, Seattle, WA (US); Elliott Joo, Seattle, WA (US); Victor Doss, San Ramon, CA (US); Tejaswi Tenneti, San Carlos, CA (US); Prakash Putta, Seattle, WA (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/945,381

(22) Filed: Nov. 12, 2024

(51) Int. Cl.
 *G06F 16/9538* (2019.01)
 *G06F 40/103* (2020.01)
(52) U.S. Cl.
 CPC ........ *G06F 16/9538* (2019.01); *G06F 40/103* (2020.01)
(58) Field of Classification Search
 CPC ................ G06F 16/9538; G06F 40/103
 See application file for complete search history.

(56) References Cited

U.S. PATENT DOCUMENTS

2009/0265611 A1* 10/2009 Sengamedu ........ G06F 16/9577 715/234
2013/0067364 A1* 3/2013 Berntson ............... G06F 16/951 707/723

OTHER PUBLICATIONS

Irfan Prazina et al., "Methods for Automatic Web Page Layout Testing and Analysis: A Review", IEEE, pp. 13948-13964 (Year: 2023).*

* cited by examiner

*Primary Examiner* — Jared M Bibbee
(74) *Attorney, Agent, or Firm* — Fenwick & West LLP

(57) ABSTRACT

An online system receives, at a search interface, a search query from a user. The online system determines a recall set size for search results of the search query. The online system determines a page load size to display at least a portion of the search results by determining a query entropy associated with the search query, inputting a plurality of signals into a machine learning model, the plurality of signals comprising the query entropy, and receiving, from the machine learning model, the page load size. The online system selects a set of physical object identifiers based on the page load size. The online system generates for display a user interface that groups the selected physical object identifiers. The online system causes a device associated with the user to display the generated user interface.

20 Claims, 4 Drawing Sheets

400

```
┌─────────────────────────────────────────────────────────────┐
│ Receive, at a search interface of an online system, a       │
│ search query from a user of the online system               │
│ 410                                                         │
└─────────────────────────────────────────────────────────────┘
                              ↓
┌─────────────────────────────────────────────────────────────┐
│ Generate a recall set size for search results of the        │
│ search query                                                │
│ 420                                                         │
└─────────────────────────────────────────────────────────────┘
                              ↓
┌─────────────────────────────────────────────────────────────┐
│ Generate a page load size to display at least a portion of  │
│ the search results                                          │
│ 430                                                         │
└─────────────────────────────────────────────────────────────┘
                              ↓
┌─────────────────────────────────────────────────────────────┐
│ Select a set of physical object identifiers based on the    │
│ page load size                                              │
│ 440                                                         │
└─────────────────────────────────────────────────────────────┘
                              ↓
┌─────────────────────────────────────────────────────────────┐
│ Generate for display a user interface that groups the       │
│ selected physical object identifiers                        │
│ 450                                                         │
└─────────────────────────────────────────────────────────────┘
                              ↓
┌─────────────────────────────────────────────────────────────┐
│ Cause a device associated with the user to display the      │
│ generated user interface                                    │
│ 460                                                         │
└─────────────────────────────────────────────────────────────┘
```

FIG. 4

MACHINE LEARNING APPROACH TO PROVIDE ADAPTIVE SEARCH RESULT PAGE LOAD SIZE AND LAYOUT

BACKGROUND

User interfaces of some client devices may fail to deliver search results in a volume tailored to a context of a search query. The fixed-size approach to search results may fail to adapt to the diverse nature of search queries and product catalogs, often hiding some highly relevant results from immediate view. This limitation may lead to a series of iterative searches as users refine their queries to find relevant results. Each refined search query may trigger new database lookups, many of which may be redundant, leading to increased network latency and computational waste. Such a process is not only time-consuming for users but also computationally inefficient, resulting in repeated parsing of massive amounts of database entries. This brute-force search query refinement may cause the same database entries to be searched multiple times, consuming unnecessary network bandwidth for unused search results.

SUMMARY

An improved online system with dynamic page load size determination adjusts the number and layout of search results displayed, thus providing relevant search results that reduce the need for search query refinement, and optimizing computational resource usage. For example, a search query for a physical object (e.g., whole wheat pasta) may provide an adaptive search results page with an optimal number of physical object identifiers or an adaptive layout based on a plurality of factors such as the search query context, user profile, and platform characteristics. This dynamic approach to search results may allow users to find relevant information more quickly, thus reducing follow-up searches and optimizing computational resource usage.

In accordance with one or more aspects of the disclosure, an online system receives, at a search interface, a search query from a user. The online system generates a recall set size for search results of the search query. The online system generates a page load size to display at least a portion of the search results by generating a query entropy associated with the search query, inputting a plurality of signals into a machine learning model, the plurality of signals comprising the query entropy, and receiving, from the machine learning model, the page load size. The online system selects a set of physical object identifiers based on the page load size. The online system generates for display a user interface that groups the selected physical object identifiers. The online system causes a device associated with the user to display the generated user interface.

BRIEF DESCRIPTION OF THE DRAWINGS

FIG. 4 is a flowchart of a method for providing search results, according to one or more embodiments.

DETAILED DESCRIPTION

Figure 1:
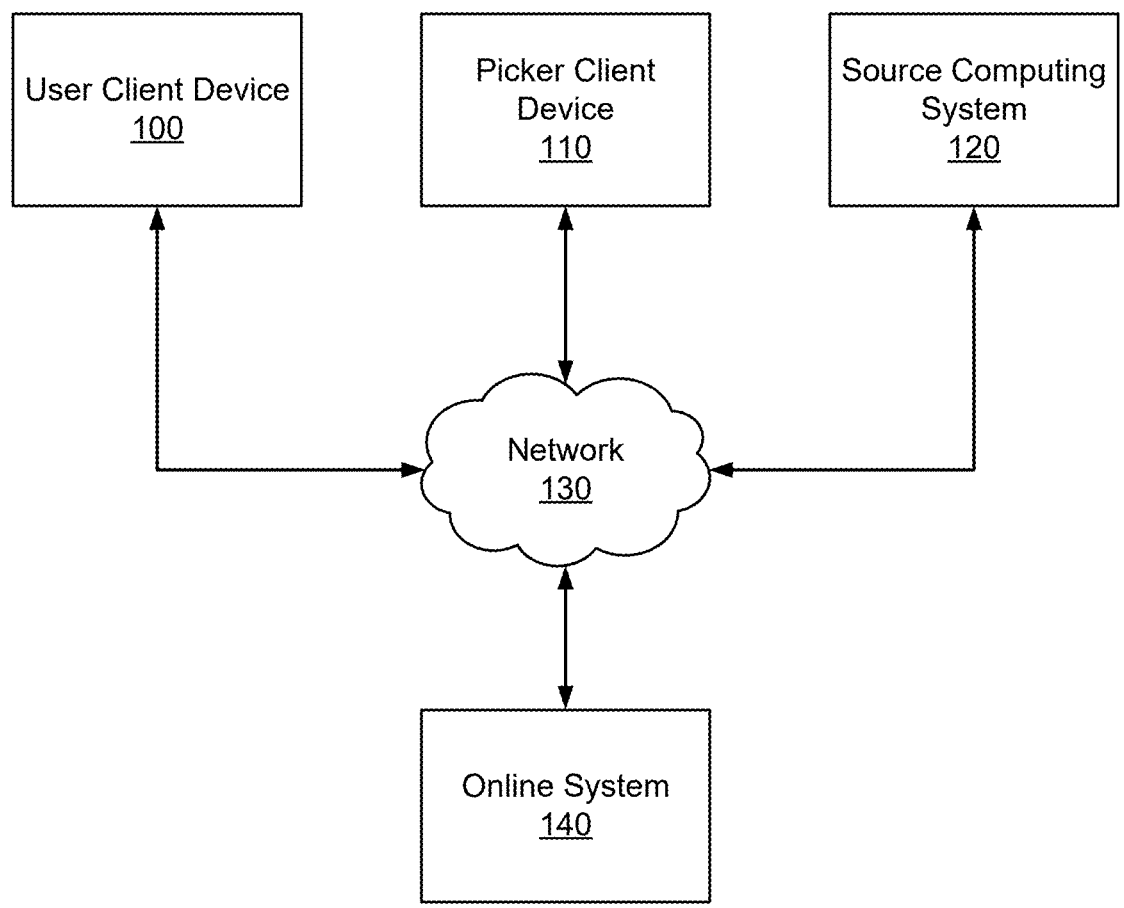
FIG. 1 illustrates an example system environment for an online system, in accordance with one or more embodiments.

FIG. 1 illustrates an example system environment for an online system 140, in accordance with one or more embodiments. The system environment illustrated in FIG. 1 includes a user client device 100, a picker client device 110, a source computing system 120, a network 130, and an online system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and source computing system 120 are illustrated in FIG. 1, any number of users, pickers, and sources may interact with the online system 140. As such, there may be more than one user client device 100, picker client device 110, or source computing system 120.

The user client device 100 is a client device through which a user may interact with the online system 140 or the source computing system 120. The user client device 100 can be a personal or mobile computing device, such as a smartphone, a tablet, a laptop computer, or desktop computer. In some embodiments, the user client device 100 executes a client application that uses an application programming interface (API) to communicate with the online system 140.

A user uses the user client device 100 to place an order with the online system 140. An order specifies a set of items to be delivered to the user. An "item," as used herein, may be an example of a physical object. While the item is used as an example of the physical object in this disclosure, the physical object may also include other examples. The item may refer to a product that can be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more sources from which the ordered items should be collected.

The user client device 100 presents an ordering interface to the user. The ordering interface is a user interface that the user can use to place an order with the online system 140. The ordering interface may be part of a client application operating on the user client device 100. The ordering interface may allow the user to search for items that are available through the online system 140 and the user can select which items to add to an "ordering list." An "ordering list," as used herein, is a tentative set of items that the user has selected for an order but that has not yet been finalized for an order. The ordering interface allows a user to update the ordering list, e.g., by changing the quantity of items, adding or removing items, or adding instructions for items that specify how the item should be collected.

The user client device 100 may receive additional content from the online system 140 to present to a user. For example, the user client device 100 may receive recipes or item suggestions. The user client device 100 may present the received additional content to the user as the user uses the user client device 100 to place an order (e.g., as part of the ordering interface). The user client device 100 can include a communication interface that allows the user to communicate with a picker that is servicing the user's order. This communication interface may allow the user to input a text-based message to transmit to the picker client device 110 via the network 130.

The picker client device 110 is a client device through which a picker may interact with the user client device 100, the source computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140. The picker client device 110 may receive orders from the online system 140 for the picker to service. A picker may service an order by collecting the items listed in the order from a source when available. The picker client device 110 may present the items that are included in the user's order to the picker in a collection interface. The collection interface is a user interface that provides information to the picker on which items to collect for a user's order and the quantities of the items. The picker can use the picker client device 110 to keep track of the items that the picker has collected to ensure that the picker collects all the items for an order. When the picker has collected the items for an order, the picker client device 110 may instruct a picker on where to deliver the items for a user's order.

The source computing system 120 is a computing system operated by a source that interacts with the online system 140. As used herein, a "source" may be an entity that operates a "source location," from which a picker can collect items. The source computing system 120 stores and provides item data to the online system 140 and may regularly update the online system 140 with updated item data. The source computing system 120 may provide the online system 140 with updated item prices, sales, or availabilities. The source computing system 120 may receive payment information from the online system 140 for orders serviced by the online system 140.

The user client device 100, the picker client device 110, the source computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all the of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which users can order items to be provided to them by a picker from a source. The online system 140 may receive orders from a user client device 100 through the network 130. The online system 140 may select a picker to service the user's order and transmit the order to a picker client device 110 associated with the picker. If the picker accepts the order, the picker collects the ordered items from a source location and delivers the ordered items to the user. The online system 140 may charge a user for the order and provide portions of the payment from the user to the picker and the source.

As an example, the online system 140 may allow a user to order physical objects from a source location. The user's order may specify which physical objects they want delivered from the source location and the quantities of each of the physical objects. The user's client device 100 transmits the user's order to the online system 140 and the online system 140 selects a picker to travel to the source location to collect the physical objects ordered by the user. The online system transmits an offer to the picker for the picker to service the order in exchange for consideration and, if the picker accepts the offer, the picker collects the physical objects from the source location. Once the picker has collected the physical objects ordered by the user, the picker delivers the physical objects to a location transmitted to the picker client device 110 by the online system 140. The online system 140 is described in further detail below with regards to FIG. 2.

Figure 2:
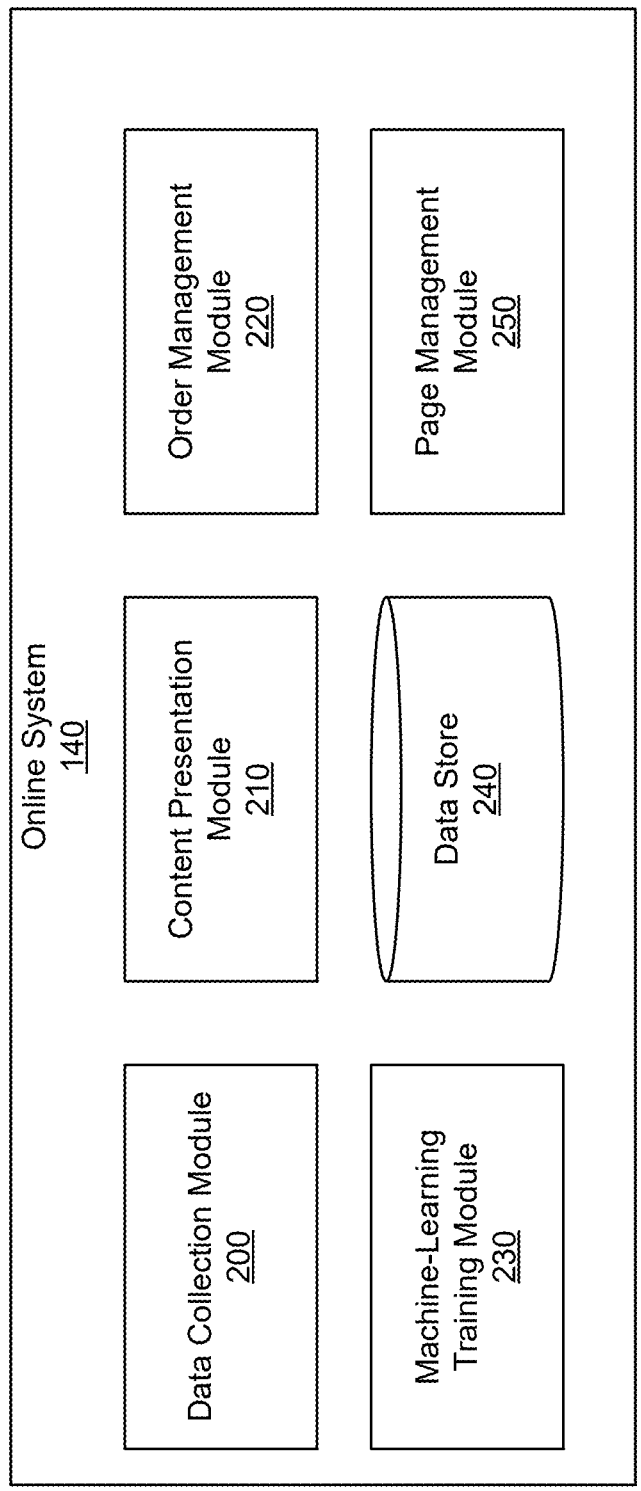
FIG. 2 illustrates an example system architecture for an online system, in accordance with one or more embodiments.

FIG. 2 illustrates an example system architecture for an online system 140, in accordance with some embodiments. The system architecture illustrated in FIG. 2 includes a data collection module 200, a content presentation module 210, an order management module 220, a machine-learning training module 230, a data store 240, and a page management module 250. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. In the preferred embodiments, the data collection module 200 only collects data describing a user if the user has previously explicitly consented to the online system 140 collecting data describing the user. Additionally, the data collection module 200 may encrypt all data, including sensitive or personal data, describing users. For example, the data collection module 200 collects user data, which is information or data that describe characteristics of a user. User data may include a user's name, address, shopping preferences, favorite items, or stored payment instruments. The user data also may include default settings established by the user, such as a default source/source location, payment instrument, delivery location, or delivery timeframe. The data collection module 200 may collect item data, which is information or data that identifies and describes items that are available at a source location. The item data may include item identifiers for items that are available and may include quantities of items associated with each item identifier. The data collection module 200 may collect picker data, which is information or data that describes characteristics of pickers. For example, the picker data for a picker may include the picker's name, the picker's location, how often the picker has serviced orders for the online system 140, a user rating for the picker, which sources the picker has collected items at, or the picker's previous shopping history.

The data collection module 200 may collect order data, which is information or data that describes characteristics of an order. For example, order data may include item data for items that are included in the order, a delivery location for the order, a user associated with the order, a source location from which the user wants the ordered items collected, or a timeframe within which the user wants the order delivered. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

While user data, picker data, source data, item data, and order data are described separately, data collected by the data collection module 200 may fall into more than one of these categories. For example, data describing a picker's performance for an order may be order data and picker data.

The content presentation module 210 selects content for presentation to a user. For example, the content presentation module 210 selects which items to present to a user while the user is placing an order. The content presentation module 210 may generate and transmit an ordering interface for the user to order items. The content presentation module 210 may populate the ordering interface with items that the user may select for adding to their order. In some embodiments, the content presentation module 210 presents a catalog of all items that are available to the user, which the user can browse to select items to order. The content presentation module 210 may identify items that the user is most likely to order and present those items to the user. For example, the content presentation module 210 may score items and rank the items based on their scores. The content presentation module 210 may display the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular source location. For example, the availability model may be trained to predict a likelihood that an item is available at a source location or may predict an estimated number of items that are available at a source location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 may manage orders for items from users. The order management module 220 may receive orders from a user client device 100 and offer the orders to pickers for service based on picker data. For example, the order management module 220 offers an order to a picker based on the picker's location and the location of the source from which the ordered items are to be collected. The order management module 220 may also offer an order to a picker based on how many items are in the order, a vehicle operated by the picker, the delivery location, the picker's preferences on how far to travel to deliver an order, the picker's ratings by users, or how often a picker agrees to service an order.

When the order management module 220 may offer an order to a picker, the order management module 220 transmits the order to the picker client device 110 associated with the picker. The order management module 220 may also transmit navigation instructions from the picker's current location to the source location associated with the order. If the order includes items to collect from multiple source locations, the order management module 220 identifies the source locations to the picker and may also specify a sequence in which the picker should visit the source locations.

The order management module 220 may track the location of the picker through the picker client device 110 to determine when the picker arrives at the source location. When the picker arrives at the source location, the order management module 220 transmits the order to the picker client device 110 for display to the picker. As the picker uses the picker client device 110 to collect items at the source location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 may track the location of the picker within the source location. The order management module 220 may use sensor data from the picker client device 110 or from sensors in the source location to determine the location of the picker in the source location. The order management module 220 may transmit to the picker client device 110, instructions to display a map of the source location indicating where in the source location the picker is located. Additionally, the order management module 220 may instruct the picker client device 110 to display the locations of items for the picker to collect, and may further display navigation instructions for how the picker can travel from their current location to the location of the next item to collect for an order.

The order management module 220 may determine when the picker has collected the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 may transmit the delivery location for the order to the picker client device 110. The order management module 220 may also transmit navigation instructions to the picker client device 110 that specify how to travel from the source location to the delivery location, or to a subsequent source location for further item collection.

The order management module 220 may track the location of the picker as the picker travels to the delivery location for an order, and updates the user with the location of the picker so that the user can track the progress of the order.

In some embodiments, the order management module 220 may facilitate communication between the user client device 100 and the picker client device 110. As noted above, a user may use a user client device 100 to send a message to the picker client device 110. The order management module 220 may receive the message from the user client device 100 and transmits the message to the picker client device 110 for presentation to the picker. The picker may use the picker client device 110 to send a message to the user client device 100 in a similar manner.

The order management module 220 may coordinate payment by the user for the order. The order management module 220 may use payment information provided by the user (e.g., a credit card number or a bank account) to receive payment for the order. In some embodiments, the order management module 220 may store the payment information for use in subsequent orders by the user. The order management module 220 may compute the total cost for the order and charges the user that cost. The order management module 220 may provide a portion of the total cost to the picker for servicing the order, and another portion of the total cost to the source.

The machine-learning training module 230 can train machine-learning models used by the online system 140. The online system 140 may use machine-learning models to perform functionalities described herein. Examples machine-learning models may include LLMs, regression models, support vector machines, naïve Bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, transformers, large-language models, or multi-modal large language models.

A machine-learning model may include components relating to these different general categories of model, which may be sequenced, layered, or otherwise combined in various configurations. While the term "machine-learning model" may be broadly used herein to refer to any kind of machine-learning model, the term may generally be limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model may include a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 may generate the set of parameters (e.g., the particular values of the parameters) for a machine-learning model by "training" the machine-learning model. Once trained, the machine-learning model uses the set of parameters to transform inputs into outputs.

The machine-learning training module 230 can train a machine-learning model based on a set of training examples. Each training example may include input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from the input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 may apply the machine-learning model to the input data in the training example to generate an output based on a current set of parameter values. The machine-learning training module 230 may score the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 may update the set of parameters for the machine-learning model based on the score generated by the loss function. For example, the machine-learning training module 230 may apply gradient descent to update the set of parameters.

In some embodiments, the machine-learning training module 230 may use an iterative process to train an LLM using a training dataset. The training dataset may include instances of search terms, sets of items matching those terms, and grouping parameters used for organizing search results. These instances may be derived from aggregated feedback data collected from user interactions with search results. The machine-learning training module 230 may input, into the LLM, a search term and its associated set of items from each training data instance. The machine-learning training module 230 may prompt the LLM to generate one or more grouping parameters based on the inputs.

The machine-learning training module 230 may receive the grouping parameters generated by the LLM. The machine-learning training module 230 may compare the grouping parameters to known grouping parameters from the training dataset to calculate a loss function. The machine-learning training module 230 may adjust the variables of the LLM to reduce the loss provided by the loss function. The machine-learning training module 230 may repeat the training process across multiple batches of training data instances to refine the LLM's ability to generate relevant grouping parameters. The machine-learning training module 230 may repeat the training process until a predetermined performance threshold is achieved or a maximum number or a predetermined of iterations is reached. These embodiments are further discussed in reference to FIG. 3.

The data store 240 may store data used by the online system 140. For example, the data store 240 may store user data, item data, order data, and picker data for use by the online system 140. The data store 240 may also store LLMs trained by the machine-learning training module 230. For example, the data store 240 may store the set of parameters for a trained LLM on one or more non-transitory, computer-readable media. The data store 240 may use computer-readable media to store data, and may use databases to organize the stored data.

The page management module 250 may provide a dynamically selected page type with an optimal number of search results. The term "optimal number" in this context refers to a number of sufficient relevant search results that reduces the need for query refinement while not overwhelming the system resources or the user, balancing user experience and computational efficiency. Responsive to receiving a user search query, the page management module 250 may generate a recall set size for search results. The page management module 250 may generate a page load size to display at least a portion of the search results by generating a query entropy associated with the search query. The page management module 250 may select a set of physical object identifiers based on the page load size. The page management module 250 may generate for display a user interface that groups the selected physical object identifiers. The page management module 250 may cause a device associated with the user to display the user interface that groups the selected physical object identifiers. The page management module 250 is described below in greater details in reference to FIG. 3.

Figure 3:
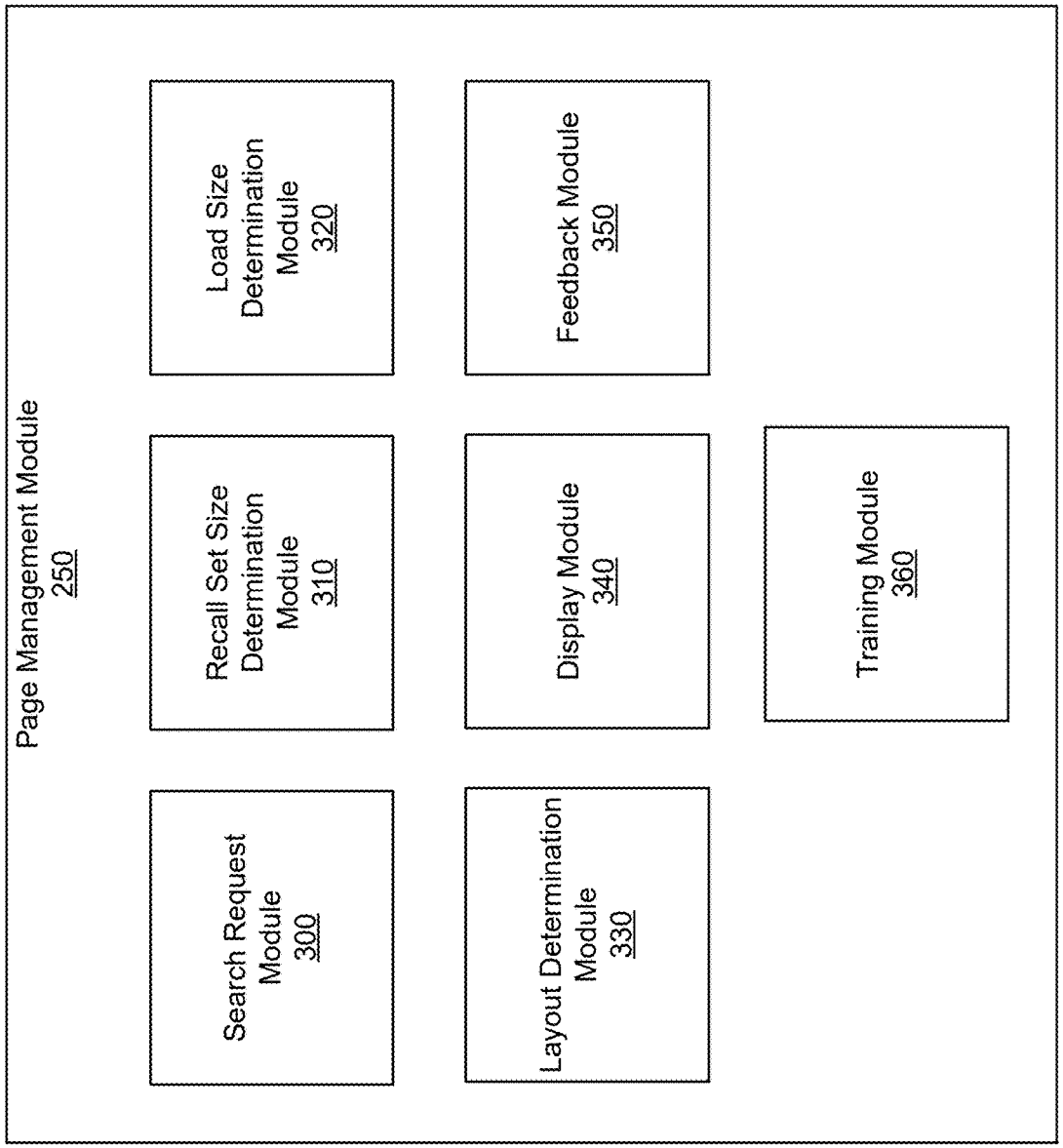
FIG. 3 illustrates an example system architecture for a page management module, in accordance with one or more embodiments.

FIG. 3 illustrates an example system architecture for a page management module 250, in accordance with some embodiments. The system architecture illustrated in FIG. 3 includes a search request module 300, a recall set size determination module 310, a load size determination module 320, a layout determination module 330, a display module 340, a feedback module 350, and a training module 360. Alternative embodiments may include more, fewer, or different components from those illustrated in FIG. 3, and the functionality of each component may be divided between the components differently from the description below.

In some embodiments, the search request module 300 may execute a search request responsive to receiving a user's search query and/or responsive to detecting the user accessing a search interface. The search request module 300 may operate in conjunction with the content presentation module 210 of FIG. 2 to facilitate user searches. The content presentation module 210 may generate and present to a user the search interface on the user client device 100. The search interface can be a graphical component of the online system's user interface presented on the user client device 100. The search interface can include a text input field where users can enter one or more search terms to find physical objects available for delivery to a destination site specified by the user. A search term may be a word or set of words. For example, a user may be searching for a physical object such as "pasta" by entering the search term "pasta" into the text input field of the search interface.

Responsive to the user inputting a search term into the search interface on the user client device 100, the search request module 300 may receive a user search query including the search term. In some embodiments, in addition to the search term, the user search query may further include auxiliary information derived from network communications or the user's client device, such as user ID, timestamp, device information, etc., and may additionally or alternatively be supplemented with user profile information.

The search request module 300 may validate and/or format the search query for further processing. The search request module 300 may store the search query and/or associated metadata within the data store 240. The search request module 300 may provide the search query to the recall set size determination module 310 for further processing.

The search request module 300 can retrieve a set of search results by querying a database of physical objects in the data store 240 using the search term. The query process may use full-text search algorithms, semantic matching, or machine learning models to identify relevant physical object identifiers. The set of physical objects that match the search term may include any combination of candidate data fields such as an object identifier, an object name, an engagement score, a description, and various other attributes such as brand, weight, type, or price. The object identifier field may indicate a unique ID for each physical object. The object name field may indicate the name of the physical object. The engagement score field may indicate the engagement score of the physical object. The description field may indicate a summary of the physical object's features or characteristics.

The search request module 300 may rank the retrieved physical objects based on factors including the engagement score. The engagement score may be a numerical value representing the historical popularity or relevance of a physical object in relation to a given search query. The engagement score may be calculated using historical data, particularly focusing on past search queries that included a similar search term and resulted in delivery requests for corresponding physical objects.

The recall set size determination module 310 may generate the recall set size for the search results. In one approach, the recall set size is defined as the size of the set of search results. For example, the search request module 300 may retrieve and rank 50 physical object identifiers in response to a user search request. In this example, the recall set size determination module 310 can set the recall set size to 50, which is the total number of matching physical objects found. In another approach, the recall set size may not be predetermined, for example, depending on the recall set size determination module configuration. For example, if the recall set size is predetermined to be 30, the recall set size determination module 310 may select the top 30 ranked physical object identifiers from the ranked list of 50 physical object identifiers. This selection may be based on the ranking already provided by the search request module 300, which may consider factors such as relevance and/or engagement scores.

In a further approach, the recall set size determination module 310 may use a machine learning model (e.g., a regression model) to generate the recall set size. For example, the recall set size determination module 310 may input, into the machine learning model, a plurality of signals such as the search query, user profile data (e.g., user's search history data, purchase history data, and demographic data, etc.), platform characteristics data (e.g., device type, screen size, app version, etc.), and other contextual data (e.g., time of day, user location, and current trend/event data, etc.). Responsive to the inputs, the machine learning model can output the recall set size, which is received by the recall set size determination module 310.

Historical data, including past search queries, result data sets, and user interactions, may be used to train and validate the machine learning model. In one approach, to train the machine learning model for recall set size determination, a training dataset may be created from the historical search data. This training dataset may include input features such as search queries, user profile data, platform characteristics data, and contextual data from past searches, along with output labels representing optimal recall set sizes determined from past user interaction data and search performance metrics. The training process may include preprocessing the data, including normalization and encoding categorical variables, then splitting the dataset into training and validation sets. The training data may be fed into the machine learning model, and an optimization algorithm (e.g., stochastic gradient descent) may be used to adjust the machine learning model's parameters to minimize the difference between predicted and actual recall set sizes. The machine learning model's performance may be validated by using the validation set. The training process may be iterated until reaching satisfactory performance. The machine learning model may be regularly trained with new training datasets to adapt to changing user behaviors and search patterns.

The search request module 300 can store the search results and the recall set size in the data store 240 as a data structure object (e.g., JavaScript object notation (JSON) object). The data structure object can include the search query (e.g., "whole wheat pasta"), a timestamp of when the search was performed, the recall set size (e.g., 50), and a plurality of ranked results. Each result can include any combination of one or more of a physical object identifier (e.g., "Physical_Object_1"), a physical object name (e.g., "Barilla Whole Grain Spaghetti"), an engagement score (e.g., 0.82), a description of the physical object, and additional attributes such as brand, weight, type, etc. The results can be ordered based on factors such as their engagement score, from highest to lowest, to reflect the ranking determined by the search request module 300. The data structure object can allow for efficient storage and retrieval of the search results, capturing all key information about each product and the overall search context, which can be used by the modules of the page management module 250.

The load size determination module 320 can process the data structure object including the search results and the recall set size to generate a page load size. The page load size can represent the optimal number of search results to display initially on a user interface of a client device responsive to a search request by a user. The page load size can be dynamically calculated for each search query based on a query entropy. The determination of the page load size can also be based on other factors such as the recall set size, user profile data, and platform characteristics. Unlike a fixed number of results, the page load size can adapt to the specific context of each search to balance user experience with system efficiency. For example, a more specific query (e.g., whole wheat pasta from Italy) may result in a smaller page load size with highly relevant results, while a broader query (e.g., whole wheat pasta) may lead to a larger page load size to provide diverse available options. The page load size may impact the number of physical object identifiers that are selected for initial display on a user interface of a client device; thus, the amount of content a user sees before needing to load more results or refine their search is determined based on the page load size. This dynamic approach may optimize the presentation of search results, potentially reducing the need for pagination or query refinement.

In one approach, to calculate the page load size, the load size determination module 320 may generate a query entropy associated with the search query. The query entropy can be a numerical value that measures the breadth of a search query relative to the diversity of physical objects stored in the database of a physical object source. For example, broad search queries (e.g., whole wheat pasta) may have higher query entropies, as they result in a wide range of physical objects likely to lead to user engagement, while narrow search queries (e.g., whole wheat pasta from Italy) may have lower query entropies, as they result in fewer physical objects likely to lead to user engagement. In some embodiments, the query entropy can vary for the same search term across different physical object sources, depending, for example, on their database diversity.

In some embodiments, the load size determination module 320 may calculate the query entropy using user engagement data for search queries for a given physical object source. The query entropy calculation may include summing physical object entropies for all unique physical objects in the search results, where a physical object entropy is based on the probability of a user engaging with the physical object.

In some embodiments, the load size determination module 320 can generate the query entropy for a search query based on historical data associated with historical search queries and historical performance of a specific action (e.g., request for delivery of a physical object to a destination site specified by the user) by users associated with those historical search queries with respect to a given physical object source. For example, the load size determination module 320 can obtain data for a search query, indicating a number of occurrences of the specific action by one or more users for each of a set of different physical objects, and including search results for the search query from the database of the physical object source. The load size determination module 320 may compute the query entropy as a function of the number of occurrences of the specific action for the different physical objects included in the search results.

For example, the query entropy for a combination of a search query and a physical object source is determined as:

$$QE = -\sum_{pid} P(\text{term\_pid\_conversion}) \log P(\text{term\_pid\_conversion})$$

Where: QE is the query entropy, $$P(\text{term\_pid\_conversion}) = \frac{\text{count(term, product\_id)}}{\text{count(term)}},$$

pid is a unique physical object identifier for a physical object in the database of a physical object source, count(term, product_id) is a number of occurrences of the specific action for a specific physical object corresponding to product_id resulting from the search query, and count(term) is a total count of performance of the specific action by users resulting from the search query. Hence, P(term_pid_conversion) represents a likelihood that a user performed the specific action with a physical object having identifier pid from search results corresponding to the search query. The term P(term_pid_conversion)log P(term_pid_conversion) represents a physical object entropy for a specific physical object corresponding to identifier pid, computed as a product of a probability of the user performing the specific action with the physical object and a logarithm of the probability of the user performing the specific action with the physical object. The query entropy (QE) for the search query can be computed as a sum of the physical object entropies over all unique physical objects in the selected set of physical objects from the database for the identified physical object source. Hence, the query entropy for the search query can indicate the breadth of the set of physical objects selected from the database of a given physical object source.

The load size determination module 320 may input, into a machine learning model, a plurality of signals including the determined query entropy for the search query. The plurality of signals can further include one or more of the search query, the recall set size, user profile data, and platform data. The user profile data may include user search history, user preferences, etc. The platform data may include device type, screen size, etc. Responsive to the input, the machine learning model can generate an output including a recommended page load size, which is received by the load size determination module 320.

For example, the load size determination module may retrieve 320, from the data store 240, the data structure object including the search query "whole wheat pasta," a timestamp, a recall set size (e.g., 50), and a plurality of ranked results (e.g., 50 physical object identifiers such as "Barilla Whole Grain Spaghetti" with engagement score 0.82). The load size determination module 320 may calculate the query entropy associated with the search query "whole wheat pasta", resulting in a value of 3.5. The load size determination module 320 may prepare inputs for the machine learning model, including the query entropy, the search query, the recall set size, user profile data (e.g., data on past pasta searches), and platform data (e.g., mobile device with small screen). The load size determination module 320 may feed these inputs into the machine learning model. The machine learning model may output a recommended page load size of 15, which the load size determination module 320 receives and sets as the number of physical object identifiers to be initially displayed on the user's device.

The layout determination module 330 can provide a selection and an arranging physical object identifiers for display based, for example, on the page load size determined by the load size determination module 320. In some embodiments, the layout determination module 330 can select physical object identifiers for display based on their relevance and ranking, as determined earlier in the search process. Given a scenario where there are 50 initial search results and the load size determination module 320 recommends a page load size of 15 results, the layout determination module 330 may select the top 15 ranked physical object identifiers from the initial set of 50. The remaining 35 results may be available for loading by use of a "load more" button if the user wants to see more search results. In some embodiments, the layout determination module 330 may also consider result diversity to avoid showing too many similar search results. The layout determination module 330 may factor in user preferences or past behavior to refine the selection process, and/or may adapt based on contextual factors like time of day or user location. Additionally, the chosen layout format may influence the final selection of search results to provide that the physical object identifiers work well within the display structure.

The layout determination module 330 can generate a plurality of candidate page layouts based on the page load size. In some embodiments, a page layout can be defined as a specific arrangement of physical object identifiers and other elements on a search results page, determining how the search results are presented visually to the user. The elements of a page layout may include the physical object identifiers as core content, the overall layout format (such as grid, list, or carousel), and the specific positioning of each element within the layout. The page layout can further include the size and prominence of individual physical object identifiers, which may vary based on relevance or ranking. Other elements of the page layout may include a control button for loading additional results, headers and category labels for organization, styling and formatting for visual appeal, and dynamic elements like interactive features. The page layout may also include pagination elements, filtering and sorting elements, and adaptive components that change based on device type or screen size. The page layout may present search results in a way that optimizes user engagement and satisfaction, balancing factors like relevance, diversity, and ease of navigation.

Each candidate page layout can provide a distinct arrangement of the selected physical object identifiers. To generate the plurality of candidate page layouts, the layout determination module 330 can access a set of candidate layout formats. For example, the layout determination module 330 can access pre-defined candidate layout formats stored on the data store 240. These candidate layout formats can include various arrangements such as grid layouts, list layouts, carousel layouts, or combinations thereof. Each format can have specific parameters defining how physical object identifiers are positioned and sized within the layout. In some embodiments, the characteristics of a candidate layout format can include: the layout structure (e.g., grid, list, or carousel); the number of rows and columns, for example, in grid layouts or carousel layouts; the positioning of each physical object identifier within the layout; one or more pagination elements; the size and prominence of individual physical object identifiers, which may vary based on relevance or ranking; a control button for loading additional results; placement options for the control button (e.g., bottom of layout, after certain rows); headers and category labels for organization; styling and formatting for visual appeal; dynamic elements such as interactive features; one or more filtering elements; adaptive elements that change based on device type or screen size; spacing requirements between elements; margins and/or padding; and alignment of elements.

In some embodiments, the layout determination module 330 may apply a latency constraint as a guardrail when generating candidate page layouts. The latency constraint can provide that the candidate page layouts are able to be rendered and displayed in a user interface of a client device within a predetermined timeframe (e.g., a threshold). For example, the latency constraint can include a latency estimation model that predicts an expected loading time for each candidate page layout. If the predicted latency for a candidate page layout exceeds a defined threshold, the layout determination module 330 may reject the candidate page layout, or modify it to reduce complexity and latency. In some embodiments, the latency estimation model can predict the expected loading time for each candidate page layout using a combination of factors and historical data. The latency estimation model may use a weighted sum of factors including a base loading time, time per physical object identifier, layout complexity factor, image loading factor, and device performance factor. In some embodiments, the latency estimation model may define a base loading time of 100 milliseconds (ms), add 10 ms for each physical object identifier, multiply by a layout complexity factor (e.g., 1.0 for grid, 1.2 for carousel), add 50 ms for each image, and adjust the loading time based on client device performance (e.g., multiplying by 1.0 for high-end devices, 1.5 for low-end devices, etc.). High-end devices may be defined as those with multi-core processors operating at clock speeds of 2.5 GHz or higher, with at least 6 GB of RAM, and capable of 5G network connectivity. Low-end devices may be defined as those with single or dual-core processors operating at clock speeds below 2 GHz, with 4 GB of RAM or less, and limited to 3G or 4G network connectivity. According to one specific example, for a grid layout with 15 physical object identifiers and images on a client device, the latency estimation model may determine the expected loading time as follows: (100 ms base+(15*10 ms per identifier)+(5*50 ms per image))*1.0 grid factor *1.2 device factor, resulting in an expected loading time of 600 ms. This predicted loading time may be compared against the latency constraint threshold to determine if the layout is acceptable or requires modification.

The layout determination module 330 can select two or more layout formats from the set of candidate layout formats. This selection may be based, for example, on at least historical layout performance data. The layout determination module 330 may access, on the data store 240, historical layout performance data on how different candidate layout formats have performed for similar searches and/or user contexts. The historical layout performance data may include metrics such as click-through rates, time spent on page, or requests for delivery of physical objects for each candidate layout format. The layout determination module 330 may analyze the historical layout performance data, for example using a ranking algorithm, to select the top-performing layout formats for the current context. The layout determination module 330 may consider factors such as the search query type, user demographics, or device characteristics when making this selection.

For each selected layout format, the layout determination module 330 can arrange the selected physical object identifiers according to the selected layout format in a candidate page layout. In one approach, for each selected layout format, the layout determination module 330 can create a specific instance of that layout using the current set of physical object identifiers. The layout determination module 330 can determine the number of physical object identifiers that can fit in the layout based on the page load size by considering the layout's dimensions, physical object identifier sizes, and spacing requirements. For example, in a grid layout, the layout determination module 330 may calculate the number of rows and columns that fit within the available screen space, accounting for margins and padding. The layout determination module 330 can assign each physical object identifier to a specific position within the layout, for example, in order of relevance or ranking.

The layout determination module 330 can adjust the size of each physical object identifier based on its ranking or relevance score. This adjustment may include allocating more screen space, using larger fonts, or placing higher-ranked items in more noticeable positions within the layout. For example, the most relevant physical object identifiers may be displayed at the top of the page or in a larger format, while less relevant physical object identifiers may be shown in smaller sizes or lower positions. The layout determination module 330 can provide that the layout fits to any design constraints or rules specific to that format, such as maintaining consistent spacing or alignment. The layout determination module 330 can customize aspects of the layout based on the specific physical object identifiers, such as highlighting those with images differently from those without, to provide visual appeal or user engagement.

The layout determination module 330 can identify a position for a control button in each candidate page layout based on the page load size. The control button can be configured to initiate loading of additional physical object identifiers from the search results when activated by the user. In some embodiments, the layout determination module 330 can identify the position of the control button in each candidate layout format based on the page load size. The layout determination module 330 can assess available space after placing initial physical object identifiers, define placement options (e.g., bottom of layout, after certain rows), and consider the page load size for positioning of the control button. The layout determination module 330 may provide that the button is visible and easily accessible without obstructing content. The layout determination module 330 can position the control button based on client device constraints for optimal placement on both mobile and desktop layouts. This approach may provide dynamic, context-aware control button positioning that facilitates easy access to additional search results. Examples of candidate layout formats may be the following: Candidate layout format #1 (layout structure: grid layout; number of rows and columns: 3 columns, variable number of rows; positioning: physical object identifiers placed in a grid pattern; size and prominence: uniform size for all physical object identifiers; control button: placed at the bottom of the grid; headers: category headers above each section of the grid; styling: clear borders around each physical object identifier; adaptive elements: grid adjusts to 2 columns on smaller screens; spacing: equal spacing between grid items; margins: 20 pixels margin around the entire grid); Candidate layout format #2 (layout structure: vertical list; positioning: physical object identifiers stacked vertically; size and prominence: larger size for top-ranked items, decreasing as you scroll down; control button: after every 10 items in the list; headers: sticky header at the top with filtering options; styling: each list item has a subtle hover effect; dynamic elements: expandable product descriptions; filtering elements: side panel with various filter options; adaptive elements: full width on mobile devices; alignment: left-aligned text and images); and Candidate layout format #(layout structure: horizontal scrolling carousel; number of rows and columns: single row, multiple columns visible at once; positioning: physical object identifiers placed side by side horizontally; size and prominence: center physical object identifier slightly larger and more prominent; control button:

arrows on either side for scrolling; pagination elements: bots below the carousel indicating current position; styling: smooth transition animations between slides; dynamic elements: auto-scrolling feature with pause on hover; adaptive elements: number of visible physical object identifiers adjusts based on screen width; margins: no side margins, allowing edge-to-edge design).

The layout determination module 330 can select a page layout format from the candidate layout formats to group the selected physical object identifiers by evaluating each candidate layout format's effectiveness for the given search results. In one approach, the layout determination module 330 can generate a page score for each candidate layout format by using a machine learning model. The layout determination module 330 can input, into the machine learning model, various signals (e.g., search query, user data), features derived from the search results (e.g., relevance scores, image availability, etc.), and characteristics of each candidate layout format (e.g., grid format, element positioning, etc.). The machine learning model can process these inputs and outputs a page score for each candidate layout format, indicating the predicted likelihood of user engagement. The scores can quantify how well each candidate layout format is expected to perform in terms of user interaction. The layout determination module 330 can receive the scores from the machine learning model.

The layout determination module 330 can select a page layout format for display by comparing the page scores received for each candidate layout format. In one approach, the layout determination module 330 can choose the layout with the highest page score compared to the scores of other candidate layout formats. For example, the highest-scoring layout can represent the most effective layout for presenting search results to the user. The selection process can include ranking the candidate layout formats based on their page scores and selecting the top-scoring layout as the final choice. In case of a tie or very close scores, the layout determination module 330 may consider secondary factors such as loading speed or accessibility. This approach can provide that the search results are presented in the most effective layout, optimizing for user engagement based on the specific context of the search query and user.

Responsive to the layout determination module 330 selecting a page layout, the display module 340 can generate for display a user interface, such as a carousel, on the ordering interface to group the selected physical object identifiers. The display module 340 can populate the carousel with the set of search results, rendering each physical object identifier in its designated position within the layout and applying specified styling or formatting. Additional elements like headers, category labels, or the control button for loading more results may be included. The display module 340 may provide that all physical object identifiers are properly sized and positioned within the carousel according to the layout specifications, implementing any dynamic elements such as hover effects or interactive features. This process may adapt to various layout types determined by the layout determination module 330, not limited to carousels but potentially including grids, lists, or other formats optimized for the search results. The resulting user interface can be prepared for transmission to the user's client device, where it will be rendered in the user's web browser or application, presenting the search results in the optimized layout.

The display module 340 can cause a device associated with the user to display the user interface. For example, the display module 340 can cause the user client device 100 of FIG. 1 to display the generated user interface that groups the selected physical object identifiers. In some embodiments, the display module 340 can transmit the generated user interface data to the user client device 100 via the network 130 by using one or more communication protocols as described in the present disclosure. The user client device 100 can receive the generated user interface data through a client application. The client application can use an API to communicate with the online system 140. The client application can render the received user interface data in the user client device's web browser or application environment to display the user interface that groups the selected physical object identifiers.

Responsive to generating for display the user interface, the feedback module 350 may collect and analyze feedback data associated with user interactions with the selected physical object identifiers displayed on the user interface according to the page load size. This feedback data may include various user actions, particularly user requests for delivery of physical objects from the search results, which serve as strong indicators of user interest and satisfaction with the search and presentation process. The feedback module 350 may track which physical objects users select for delivery, from which positions in the layout these selections are made, and how users navigate through the displayed results. For example, as users interact with search results for "pasta" on the ordering interface, the feedback module 350 may collect data on their behavior, such as which pasta-related physical objects they click on or select for delivery.

The feedback data may include various fields such as user-related data (demographic data, search history, user preferences), click-through rates, time spent engaging with search results, scroll depth, use of the control button to load more results, repeat interaction data, request for delivery of physical objects, abandonment rates, filter usage data, search refinement behavior data, and session duration. By analyzing this feedback data over time, the online system may infer user preferences for specific types of layouts and page load sizes. For example, a user who frequently engages with and requests delivery of physical objects from layouts with larger page load sizes may be inferred to prefer more initial result sets. Conversely, a user who consistently uses the control button to load more results may be inferred to find smaller initial page load sizes less satisfactory. The feedback data may provide an assessment of the effectiveness of different page load sizes and layout strategies, and may be used to refine the system's ability to present relevant search results. By capturing and analyzing this feedback data, the online system may continuously learn from user behavior, potentially improving the page load size determination and layout selection processes over time to better meet user needs and preferences.

The feedback module 350 can generate a training dataset based on the feedback data by aggregating the feedback data for multiple displayed user interfaces and associating the aggregated feedback data with corresponding page load sizes and layout formats. In one approach, the feedback module 350 can generate a training dataset based on the feedback data by processing and aggregating feedback data from multiple instances of search queries across various users and sessions. This aggregation can include synthesizing diverse user interaction data, such as click-through rates, engagement times, scroll behaviors, and rates of request for delivery of physical objects. The feedback module 350 can associate the aggregated feedback data with the specific page load sizes and layout formats used to present the search results, creating a multi-dimensional representation of user preferences and behaviors. For each search query, the feedback module 350 can generate a training data instance. The training data instance can include the search query itself, the page load size applied, the layout format used, the set of physical object identifiers displayed, aggregated user interaction metrics, user demographic information (anonymized for privacy), and contextual data such as time of search, device type, and location. The training data instance can also include the plurality of signals used to determine the page load size, such as query entropy, recall set size, user profile data, and platform characteristics. These features can provide that the training data captures the full context of the decision-making process for page load size determination.

The feedback module 350 can store the training data instances in the training dataset on the data store 240. By storing these instances in the training dataset, the feedback module 350 can build a repository of information that reflects real-world user behavior and preferences in relation to different page load sizes and layout formats. This training dataset can serve as a resource for improving the machine learning models used in determining optimal page load sizes and selecting the most effective layout formats for future searches.

In some embodiments, the machine learning model can be initially trained before receiving feedback data from user interactions. The training module 360 can access historical search data that includes prior search queries and corresponding user interaction data stored in the data store 240. Based on the accessed historical search data, the training module 360 can generate a training dataset. The training module 360 can extract input features from the historical search data, including search queries submitted by users, user profile data (e.g., user preferences, search history), platform characteristics data (e.g., device types, screen sizes), and contextual data (e.g., time of search, user location). The training module 360 can determine output labels comprising optimal page load sizes based on analyzing the user interaction data from the historical search data.

The training module 360 can preprocess the generated training dataset to prepare it for training. The preprocessing can include normalizing the input features to standardize their values and encoding categorical variables within the input features. The categorical variables that are encoded can include device types from the platform characteristics data (e.g., mobile, tablet, desktop), user demographic categories from the user profile data (e.g., age groups, locations), and search query categories derived from the search queries (e.g., product types, search intent). The training module 360 can divide the preprocessed training dataset into a training dataset used for model training and a validation dataset used for performance evaluation. The training module 360 can train the machine learning model using the training dataset by inputting the training dataset into the machine learning model. During training, the training module 360 can adjust variables of the machine learning model to minimize differences between predicted page load sizes and actual page load sizes that led to successful user interactions in the historical data. The training module 360 can validate the performance of the machine learning model using the validation dataset to assess how well the model generalizes to new data. The training module 360 can repeat the training of the machine learning model until either a predetermined performance threshold is met (e.g., prediction accuracy reaches a target level) or a predetermined number of iterations is reached (e.g., maximum number of training cycles).

In some embodiments, after capturing feedback data from user interactions and generating a training dataset based on the user interactions, the training module 360 can train the machine learning model for determining the page load size using the training dataset through an iterative process. For each training data instance, the training module 360 can input a plurality of signals (such as query entropy, recall set size, user profile data, and platform characteristics) into the machine learning model for determining the page load size. Responsive to these inputs, the machine learning model can generate a page load size tailored to the specific search scenario and user profile. The training module 360 can compare the machine learning model's suggested page load size with the actual page load size recorded in the training data instance. This comparison can consider not just the page load size itself, but also its effectiveness in terms of user engagement metrics, requests for delivery of physical objects, and overall user satisfaction. Based on this comparison, the training module 360 can calculate a loss function that quantifies the discrepancy between the model's suggested page load size and the known effective page load size across various dimensions of user interaction and preference. The training module 360 can then adjust the machine learning model's variables to minimize the loss function, gradually improving the machine learning model's ability to suggest relevant page load sizes.

The training module 360 can repeat the training process across multiple instances and iterations until the machine learning model reaches a predetermined performance threshold or a maximum number of iterations. The predetermined number of iterations may vary, potentially ranging from 100 to 1000 or more, depending on the complexity of the model and the desired level of accuracy. Through this approach, the training module 360 can refine the machine learning model's ability to determine effective page load sizes, leading to more optimized search result presentations for users over time. This implementation may allow the page management module 250 to dynamically adjust page load sizes based on user preferences and search context, tailoring search experiences to users while optimizing resource utilization.

In some embodiments, the training module 360 can train the machine learning model for determining the page score for candidate page layouts using the training dataset through an iterative process. For each training data instance, the training module 360 can input a page layout, along with relevant search query information, user demographic data, and contextual information into a second machine learning model. This prompts the second machine learning model to predict a page score for the given page layout, indicating its expected effectiveness for the specific search scenario and user profile. The training module 360 can then compare the second machine learning model's predicted page score with the actual page score recorded in the training data instance. This comparison may consider the page layout's effectiveness in terms of user engagement metrics, requests for delivery of physical objects, and overall user satisfaction.

Based on this comparison, the training module 360 can calculate a loss function that quantifies the discrepancy between the second machine learning model's predicted page score and the known effective page score across various dimensions of user interaction and preference. The training module 360 can then adjust the second machine learning model's variables to minimize this loss function, gradually improving the second machine learning model's ability to predict relevant page scores for different page layouts. This training process can be repeated across multiple instances and iterations until the second machine learning model reaches a predetermined performance threshold or a maximum number of iterations. Through this approach, the training module 360 can refine the second machine learning model's ability to determine effective page scores for different page layouts, leading to more optimized search result presentations for users over time. This implementation may allow the page management module 250 to dynamically evaluate and select the most effective page layout for presenting search results, tailoring search experiences to users while optimizing resource utilization.

In some embodiments, the feedback module 350 can provide a continuous improvement process by retraining the machine learning models described herein based on user interactions. Feedback data and/or updated training data may be used for the retraining process. The retraining process can include later rounds of training after an initial training, fine-tuning, and other types of operations. For example, in some embodiments, the retraining process may correspond to later iterations of an initial training, where the training module 360 may use feedback data to further adjust the machine learning model's parameters, improving its ability to predict effective layouts for future queries. In other embodiments, the retraining may correspond to further training of a trained machine learning model, building upon its existing knowledge with new data. Additionally, in some embodiments, the retraining process may correspond to the fine-tuning of a pre-trained machine learning model. The pre-trained machine learning model may be a model that was not originally trained for layout optimization purposes. The training module 360 may adapt such a model to the specific task of optimizing search result layouts through targeted fine-tuning.

FIG. 4 is a flowchart depicting an example process 400 for providing search results, in accordance with some embodiments. Some steps of the process 400 may be performed by one or more modules of the page management module 250 illustrated in FIG. 3. The process 400 may be embodied as a software algorithm that may be stored as computer instructions that are executable by one or more processors. The instructions, when executed by the processors, cause the processors to perform various steps in the process 400. In various embodiments, the process 400 may include additional, fewer, or different steps.

Process 400 begins with the page management module 250 receiving 410, at a search interface of an online system, a search query from a user of the online system (e.g., using the search request module 300). The page management module 250 then determines 420 a recall set size for search results of the search query (e.g., using the recall set size determination module 310). The page management module 250 determines 430 a page load size to display at least a portion of the search results (e.g., using the load size determination module 320). The page management module 250 then selects 440 a set of physical object identifiers based on the page load size (e.g., using the layout determination module 330). The page management module 250 generates 450 for display a user interface that groups the selected physical object identifiers (e.g., using the display module 340). The page management module 250 causes 460 a device (e.g., client user client device 100) associated with the user to display the user interface that groups the selected physical object identifiers (e.g., using the display module 340).

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a non-limiting example, the condition "A, B, or C" is satisfied when A and B are true (or present) and C is false (or not present). Similarly, as another non-limiting example, the condition "A, B, or C" is satisfied when A is true (or present) and B and C are false (or not present).

What is claimed is:

1. A computer-implemented method, comprising:
    receiving, at a search interface of an online system, a search query from a user of the online system;
    generating a recall set size for search results of the search query;
    generating a page load size to display at least a portion of the search results by:
        generating a query entropy associated with the search query,
        inputting a plurality of signals into a machine learning model, the plurality of signals comprising the query entropy, and
        receiving, from the machine learning model, the page load size;
    selecting a set of physical object identifiers based on the page load size;
    generating for display a user interface that groups the selected physical object identifiers; and
    causing a device associated with the user to display the user interface that groups the selected physical object identifiers.

2. The computer-implemented method of claim 1, wherein inputting the plurality of signals comprises inputting one or more of: the search query, the recall set size, user profile data, or platform data.

3. The computer-implemented method of claim 1, further comprising:
    generating a plurality of candidate page layouts based on the page load size, wherein each candidate page layout provides a distinct arrangement of the selected physical object identifiers; and
    selecting a page layout from the plurality of candidate page layouts to group the selected physical object identifiers.

4. The computer-implemented method of claim 3, wherein generating the plurality of candidate page layouts comprises:
    accessing a set of candidate layout formats;
    selecting two or more layout formats from the set of candidate layout formats based at least on historical layout performance data; and
    for each selected layout format, arranging the selected physical object identifiers according to the selected layout format in a candidate page layout.

5. The computer-implemented method of claim 4, further comprising:
    identifying a position for a control button in each candidate page layout based on the page load size, wherein the control button is configured to initiate loading of additional physical object identifiers from the search results when activated by the user.

6. The computer-implemented method of claim 3, further comprising:
    generating a page score for each of the plurality of candidate page layouts; and
    selecting the page layout from the plurality of candidate page layouts based on the page score for each of the plurality of candidate page layouts.

7. The computer-implemented method of claim 6, wherein generating the page score for each of the plurality of candidate page layouts comprises:
    inputting the plurality of signals, features derived from the search results and each of the plurality of candidate page layouts into a second machine learning model; and
    receiving, from the second machine learning model, the page score for each of the plurality of candidate page layouts,
    wherein the page score indicates a likelihood of user engagement.

8. The computer-implemented method of claim 1, further comprising:
    responsive to generating for display the user interface, collecting feedback data associated with user interactions with the selected physical object identifiers displayed on the user interface according to the page load size.

9. The computer-implemented method of claim 8, wherein the feedback data comprises a user request for delivery of a physical object in the selected physical object identifiers.

10. The computer-implemented method of claim 8, further comprising generating a training dataset based on the feedback data by:
    aggregating the feedback data for multiple displayed user interfaces;
    associating the aggregated feedback data with corresponding page load sizes and layout formats;
    based on the associating, generating training data instances, each comprising the associated feedback data, page load size, the plurality of signals used to determine the page load size, and the layout format; and
    storing the training data instances in the training dataset.

11. The computer-implemented method of claim 1, wherein the machine learning model is initially trained by:
    accessing historical search data comprising a plurality of previous search queries and corresponding user interaction data;
    generating, based on the accessed historical search data, a training dataset by:
        extracting, from the historical search data, input features comprising search queries, user profile data, platform characteristics data, and contextual data, and
        determining output labels comprising optimal page load sizes based on the user interaction data;
    preprocessing the generated training dataset by:
        normalizing the input features, and
        encoding categorical variables within the input features, wherein the categorical variables comprise any one of: device types from the platform characteristics data, user demographic categories from the user profile data, and search query categories derived from the search queries;
    dividing the preprocessed training dataset into a training dataset and a validation dataset;
    training the machine learning model using the training dataset by:
        inputting, into the machine learning model, the training dataset,
        adjusting variables of the machine learning model to minimize differences between predicted and actual page load sizes, and
        validating performance of the machine learning model using the validation dataset; and repeating the training of the machine learning model until a predetermined performance threshold is met or a predetermined number of iterations is reached.

12. The computer-implemented method of claim 10, further comprising training the machine learning model using the training dataset by:
   accessing training data instances from the training dataset;
   for each training data instance of a batch of the training data instances:
      inputting, into the machine learning model, the plurality of signals,
      receiving, from the machine learning model, a suggested page load size, and
      comparing the suggested page load size with the page load size in the training data instance;
   adjusting variables of the machine learning model based on the comparing; and
   repeating the training of the machine learning model until a predetermined performance threshold is met or a predetermined number of iterations is reached.

13. The computer-implemented method of claim 10, further comprising training a second machine learning model using the training dataset by:
   accessing training data instances from the training dataset;
   for each training data instance of a batch of the training data instances:
      inputting, into the second machine learning model, the layout format,
      receiving, from the second machine learning model, a predicted page score, and
      comparing the predicted page score with the page score in the training data instance;
   adjusting variables of the second machine learning model based on the comparing; and
   repeating the training of the second machine learning model until a predetermined performance threshold is met or a predetermined number of iterations is reached.

14. A non-transitory computer-readable medium comprising memory with instructions encoded thereon, the instructions causing one or more processors to perform operations when executed, the instructions comprising instructions to:
   receive, at a search interface of an online system, a search query from a user of the online system;
   generate a recall set size for search results of the search query;
   generate a page load size to display at least a portion of the search results by:
      generating a query entropy associated with the search query,
      inputting a plurality of signals into a machine learning model, the plurality of signals comprising the query entropy, and
      receiving, from the machine learning model, the page load size;
   select a set of physical object identifiers based on the page load size;
   generate for display a user interface that groups the selected physical object identifiers; and
   cause a device associated with the user to display the user interface that groups the selected physical object identifiers.

15. The non-transitory computer-readable medium of claim 14, wherein inputting the plurality of signals comprises inputting one or more of: the search query, the recall set size, user profile data, and platform data.

16. The non-transitory computer-readable medium of claim 14, further comprising instructions to:
   generate a plurality of candidate page layouts based on the page load size, wherein each candidate page layout provides a distinct arrangement of the selected physical object identifiers; and
   select a page layout from the plurality of candidate page layouts to group the selected physical object identifiers.

17. The non-transitory computer-readable medium of claim 16, wherein generating the plurality of candidate page layouts comprises:
   access a set of candidate layout formats;
   select two or more layout formats from the set of candidate layout formats based at least on historical layout performance data; and
   for each selected layout format, arrange the selected physical object identifiers according to the selected layout format in a candidate page layout.

18. The non-transitory computer-readable medium of claim 17, further comprising instructions to:
   identify a position for a control button in each candidate page layout based on the page load size, wherein the control button is configured to initiate loading of additional physical object identifiers from the search results when activated by the user.

19. The non-transitory computer-readable medium of claim 16, further comprising instructions to:
   generate a page score for each of the plurality of candidate page layouts; and
   select the page layout from the plurality of candidate page layouts based on the page score for each of the plurality of candidate page layouts.

20. A computer system comprising:
   one or more processors; and
   a non-transitory computer readable storage medium storing instructions that, when executed by the one or more processors, cause the one or more processors to perform operations comprising:
      receiving, at a search interface of an online system, a search query from a user of the online system;
      generating a recall set size for search results of the search query;
      generating a page load size to display at least a portion of the search results by:
         generating a query entropy associated with the search query,
         inputting a plurality of signals into a machine learning model, the plurality of signals comprising the query entropy, and
         receiving, from the machine learning model, the page load size;
      selecting a set of physical object identifiers based on the page load size;
      generating for display a user interface that groups the selected physical object identifiers; and
      causing a device associated with the user to display the user interface that groups the selected physical object identifiers.

* * * * *